United States Patent Office 3,251,392
Patented May 17, 1966

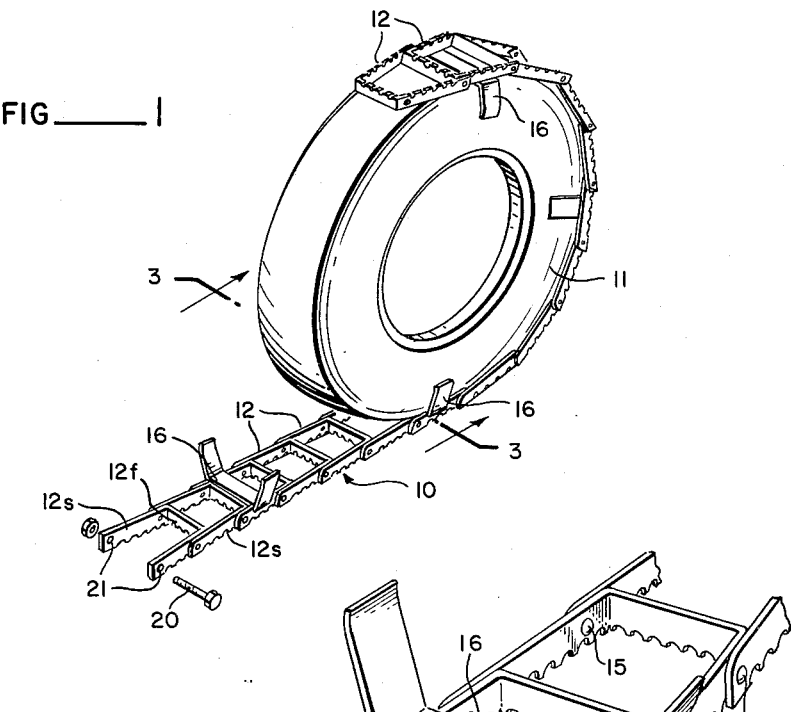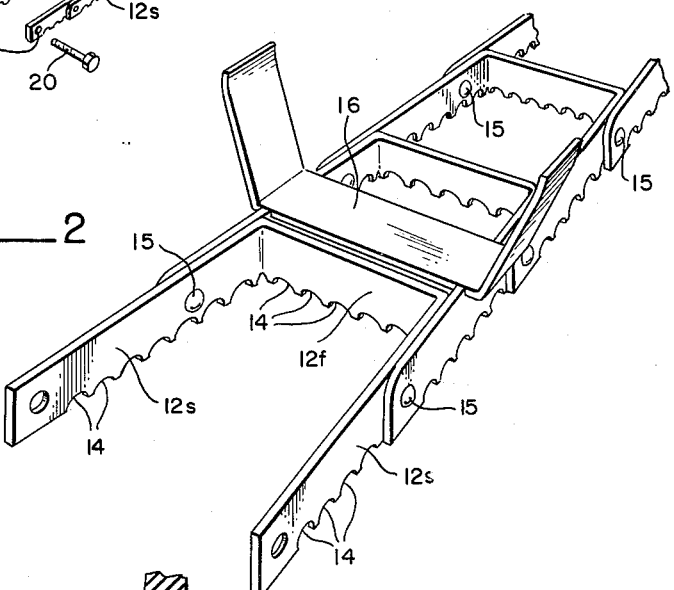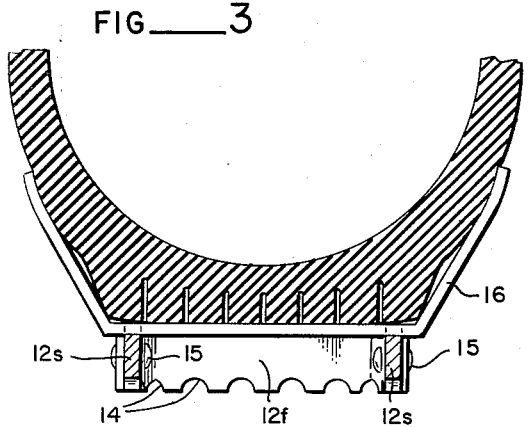

3,251,392
ANTI-SKID CHAIN
Paul D. Connell, Commodore Hotel, Room 202,
Seattle, Wash.
Filed May 22, 1964, Ser. No. 369,555
1 Claim. (Cl. 152—228)

This invention relates to improvements in anti-skid chains as designed for use on the wheels of automotive vehicles, especially on the wheels of trucks.

It is the principal object of this invention to provide a tire chain that may be easily and readily applied to a wheel and which is especially effective and desirable for use when the chain equipped wheels are required to travel on icy and snow covered surfaces or in wet and muddy roadways.

It is a further object of this invention to provide an anti-skid tire chain of the usual wrap-around character, made up of a succession of rigid, pivotally joined links, and which chain, for its easy application to a wheel, may be laid flatly upon a surface in a straight line, and will be automatically picked up by the wheel tire as the wheel is rolled therealong, thus to bring opposite end links of the chain into overlapped relationship for their joining for the securement of the chain about the wheel tire in readiness for use.

It is also an object of this invention to equip the chain at intervals therealong, with spring clips of novel formation, extending thereacross and shaped to receive the tire therein as it is rolled along the chain in its application, thus to cause the chain of pivotally joined links to be wrapped about the wheel as rolled therealong, and held in proper position for the pivotal joining of the end links to provide a continuous band about the tire.

Further objects and advantages of the invention reside in the particular formation and inter-fitting of links for their pivotal connection; in the manner of notching their surface engaging edges to give increased traction and in other details of the formation and combination of parts, as will become apparent as this specification progresses.

In accomplishing the above mentioned and other objects, I have provided the improved details of construction, the preferred forms of which are illustrated in the accompanying drawings, wherein FIG. 1 is a side view showing an anti-skid chain of the present invention, as being applied about the tire of a vehicle wheel.

FIG. 2 is an enlarged, perspective view of a short section of the present tire chain, including one of the tire gripping clips as applied to a link of the chain.

FIG. 3 is a cross-sectional view of a portion of wheel tire to which an anti-skid chain of the present invention has been applied.

Referring more in detail to the drawings:

The present tire chain is designated in its entirety as shown in FIG. 1 by reference numeral 10. It is shown in that view as being applied about the tread portion of the tire 11 of an automobile or truck wheel.

The chain 10 is made up of a succession of substantially U-shaped pivotally joined links 12, which are all of the same formation. Each link comprises a transverse base member 12f with slightly diverging opposite side portions 12s—12s. Each link is formed from a straight flat bar of metal that is bent on transverse lines to the desired shape to define the opposite side and base portions and is formed substantially to its full length in those edges of each link which in use of the chain will be directly engaged with the road surface, with a succession of semi-circular notches 14. The divergence of the opposite side members of each of the links is such that the base end of each will be received between the outer end portions of the side portions 12s—12s of the next adjacent link as seen in FIG. 2; these interfitted opposite side portions being pivotally joined by transversely aligned rivets 15—15.

Fixed across the chain at predetermined intervals, are clips 16 comprising flat metal bars that are inset in seats formed in the edges of opposite side members of the supporting link as in FIGS. 2 and 3 and which have angularly upturned opposite end portions shaped to receive the wheel tire between them with yielding grip as in FIG. 3 to hold the chain on the tire as it is rolled along the chain for its application to the tire.

With the chain wrapped about the tire as in the application illustrated in FIG. 1, the opposite end links may be brought together in an overlapped relationship and are joined by a bolt 20 applied through registered holes 21 formed in the overlapped side members 12s.

When the chain is applied to a tire each of its links have that relationship to the tire tread which is illustrated in FIG. 1 with the notched edges of the link positioned for direct contact with the road surface, and to afford ample traction for operation on icy snow or mud covered surfaces, with a great degree of safety.

Chains of this character may be made to suit tires of various sizes and diameters. The metal bars used for the formation of the individual links may vary as required for different types of vehicles. Also, they may be of various thicknesses or widths.

What I claim to be new is:

An anti-skid tire chain comprising a plurality of like links of U-shaped, each with a transverse base portion and diverging opposite side portions extending equally on the same plane from opposite ends of the transverse base portion; said links being joined in succession with the base end of each link fitted between the outer end portions of the opposite side portions of the next adjacent links thus to provide a flat chain of a length sufficient to be wrapped about a wheel tire; each link being formed from a flat bar bent on lines transversely thereof with the inner end portions of its diverging opposite side members fitted flatly against, between and pivotally attached by rivets to the outer portions of the diverging side members of the next adjacent link, allowing the base portion of each link in its application to a wheel tire, to edgewise engage against the tire tread with its opposite side members to line along and engaging flatly against opposite edges of the tread portion, each link being unobstructed between its opposite side members to its full length, and tire gripping clips applied across said chain at predetermined intervals therealong, said clips each comprising a flat bar rigidly secured to and extending flatwise across a chain link with said bar being inset into the tire engaging edge of the associated link so as to be substantially flush therewith, each clip having diverging wings of yieldable spring material extending outwardly from its opposite ends to closely embrace and yieldably grip the opposite side surface portions of the wheel tire between them.

References Cited by the Examiner
UNITED STATES PATENTS

| | | | |
|---|---|---|---|
| 1,464,781 | 8/1923 | Stewart | 152—228 |
| 2,341,317 | 2/1944 | Faulds | 152—228 X |
| 2,591,300 | 4/1952 | Sampogna | 152—228 |
| 2,608,234 | 8/1952 | Hughes | 152—213 |

ARTHUR L. LA POINT, *Primary Examiner.*
C. W. HAEFELE, *Assistant Examiner.*